United States Patent

Mazzella et al.

[11] Patent Number: 5,309,880
[45] Date of Patent: May 10, 1994

[54] DUAL INDUCTION SYSTEM FOR INTERNAL COMBUSTION ENGINE HAVING SPLAYED INTAKE PASSAGES

[75] Inventors: Richard S. Mazzella, Eastpointe; William F. Stockhausen, Northville; Gordon W. Sweetnam, Milford, all of Mich.

[73] Assignee: Ford Motor Company, Dearborn, Mich.

[21] Appl. No.: 993,533

[22] Filed: Dec. 21, 1992

[51] Int. Cl.⁵ .............................................. F02B 31/00
[52] U.S. Cl. .................................. 123/306; 123/188.14
[58] Field of Search ................... 123/306, 188.14, 432, 123/193.5

[56] References Cited

U.S. PATENT DOCUMENTS

| | | | |
|---|---|---|---|
| 4,481,922 | 11/1984 | Sugiura | 123/306 |
| 4,606,308 | 8/1986 | Furlong | 123/306 |
| 4,919,092 | 4/1990 | Smith, Jr. et al. | 123/188.14 |
| 4,926,812 | 5/1990 | Cailey | 123/188.14 |
| 4,930,468 | 6/1990 | Stockhausen | 123/188.14 |
| 5,076,224 | 12/1991 | Smith, Jr. et al. | 123/188.14 |

Primary Examiner—Raymond A. Nelli
Attorney, Agent, or Firm—Jerome R. Drouillard; Roger L. May

[57] ABSTRACT

A multicylinder reciprocating internal combustion engine with a dual induction system having at least one exhaust poppet valve and a single intake poppet valve for each cylinder, with the intake valve being located so as to control the flow of charge into the cylinder, and with each valve being operated by a rocker arm driven by a pushrod. Each intake port has a vertical dividing wall separating the port into primary and secondary passages, with the primary passages being oriented so as to cause rotational flow about the outermost portion of the cylinder, and with the secondary passages being oriented so as to cause flow directed about a radially inward portion of the cylinder. Flow through the secondary passages is controlled by a number of secondary throttle valves mounted upon a common shaft which extends through the secondary passages, but not through the primary passages.

7 Claims, 2 Drawing Sheets

DUAL INDUCTION SYSTEM FOR INTERNAL COMBUSTION ENGINE HAVING SPLAYED INTAKE PASSAGES

BACKGROUND OF THE INVENTION

This invention relates to an internal combustion engine having a single intake valve for each cylinder, which is fed fresh intake charge by primary and secondary intake port passages.

SUMMARY OF THE INVENTION

An internal combustion engine having a single intake valve and dual intake manifold runners is disclosed in U.S. Pat. No. 4,930,468, which is assigned to the assignee of the present invention. In an engine according to the present invention, a single intake poppet valve is located so as to control the flow of charge into the cylinder. The intake valve and at least one exhaust valve for each cylinder are operated by a plurality of rocker arms, with each rocker arm having a first end in contact with the stem of one of the poppet valves, and a second end in contact with a linear drive member such as a pushrod. The pushrods are actuated by a camshaft driven member such as a tappet. Each cylinder has an intake port which conducts fresh charge to the cylinder's intake valve. Each intake port has a vertical dividing wall separating the port into primary and secondary passages, with the primary passage being oriented so as to cause rotational flow in the cylinder about the outermost portion of the cylinder. The secondary passage is oriented so as to cause flow directed about a radially inward portion of the cylinder. The dividing wall includes a passage therethrough for allowing one of the pushrods to extend through the engine's cylinder head. A secondary throttle valve located within the secondary passage selectively controls the flow therethrough, according to an engine control strategy. The primary and secondary passages are splayed vertically so as to allow clearance of the secondary throttle shaft externally of the primary passages.

An engine according to the present invention allows a dual port to be used with valve systems employing conventional pushrod-operated valves, as opposed to more exotic overhead camshaft types of valve operating system. Pushrod systems offer greater package efficiency and lower cost that many other valve operating systems, particularly in engines with banks of cylinders laid out in a vee formation.

DETAILED DESCRIPTION OF THE PREFERRED EMBODIMENTS

As shown in the figures, a multicylinder reciprocating internal combustion engine having a dual induction system according to the present invention comprises an engine, 8, with a cylinder head, 10, and with a plurality of cylinders, 12. The cylinders may be arranged either in an in-line or Vee configuration, with only a single cylinder bank being illustrated.

Figure 1:
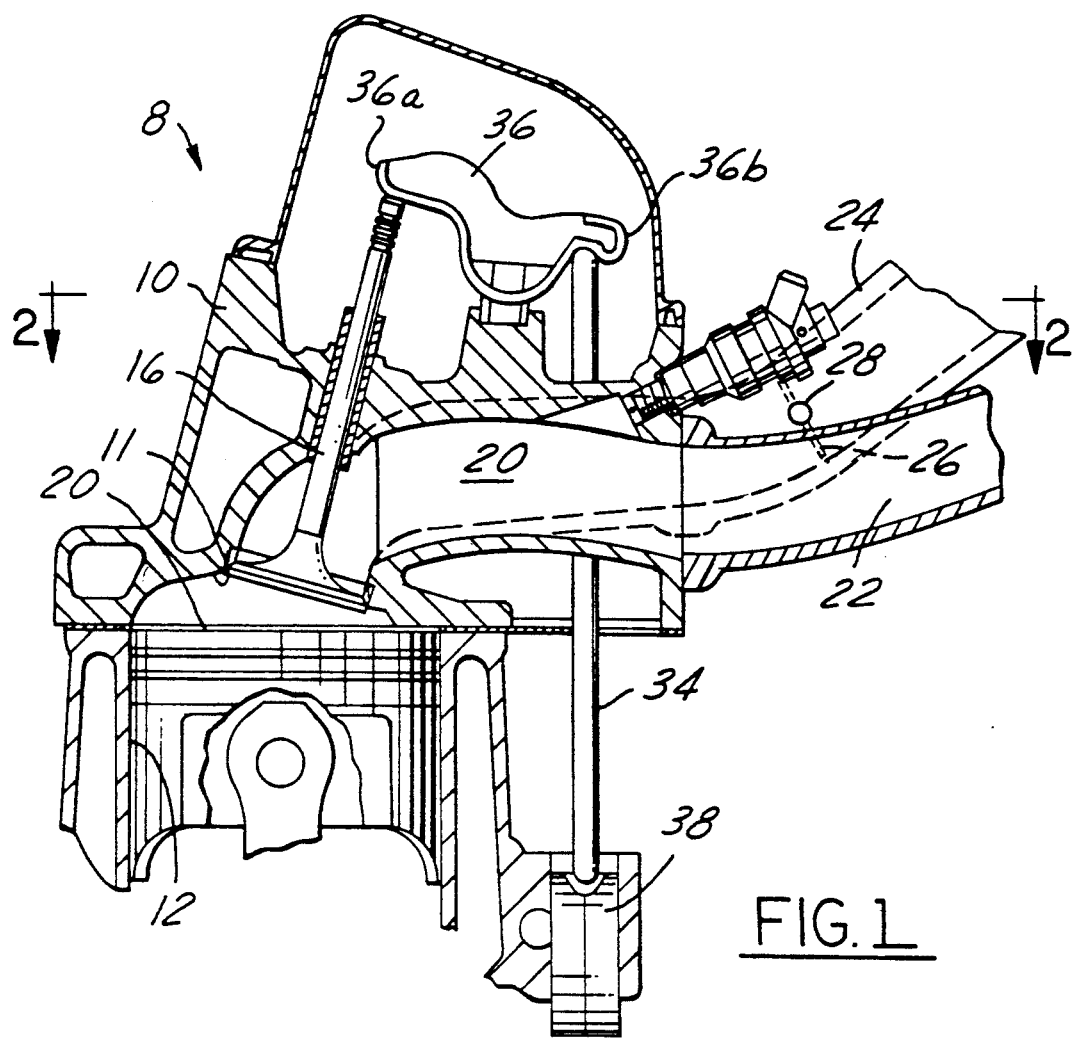
FIG. 1 is a sectional view, partially broken away, of an engine according to the present invention.
Figure 2:
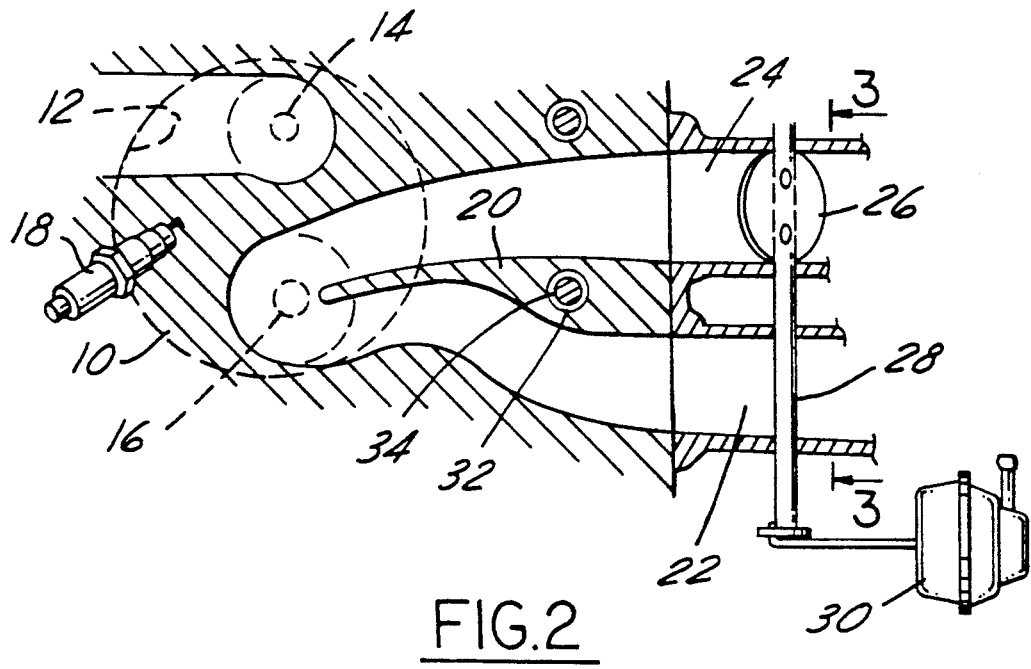
FIG. 2 is a sectional view, partially broken away, of an engine according to the present invention, taken along the line 2—2 of FIG. 1.

Continuing with FIGS. 1 and 2, engine 8 having cylinder 12 is equipped with an exhaust valve, 14 (FIG. 2), and a single intake poppet valve, 16. The engine's combustion chamber is defined by the heads of exhaust valve 14 and intake valve 16, as well as by the relatively flat piston top, 20, and the cylinder head roof, 11, which is generally wedge shaped. A sparkplug, 18, serves to ignite the mixture in the cylinder. An intake port comprising a primary port passage, 22, and a secondary port passage, 24, feeds each intake valve 16. Note that the primary and secondary port passages are defined in part by a vertical wall, 20, which divides the port and which extends entirely from the bottom to the top of the flow passage.

A plurality of secondary throttles, 26, operated by an actuator, 30, are mounted such that one of the throttles 26 controls the flow through each of secondary passages 24. Actuator 30 is operated by an engine controller, which could be an electronic, pneumatic, manual, or other type of controller known to those skilled in the art and suggested by this disclosure. In general, actuator 30 is powered by an engine controller and operates secondary throttles 26 so that the secondary throttles are open when engine speed exceeds a threshold value, regardless of engine load. And, secondary throttles 26 may further be controlled such that the secondary throttles are open at any engine speed if engine load exceeds a threshold value. Those skilled in the art will appreciate in view of this disclosure that several different control algorithms could be used for the purpose of controlling secondary throttle valves 26.

Figure 3:
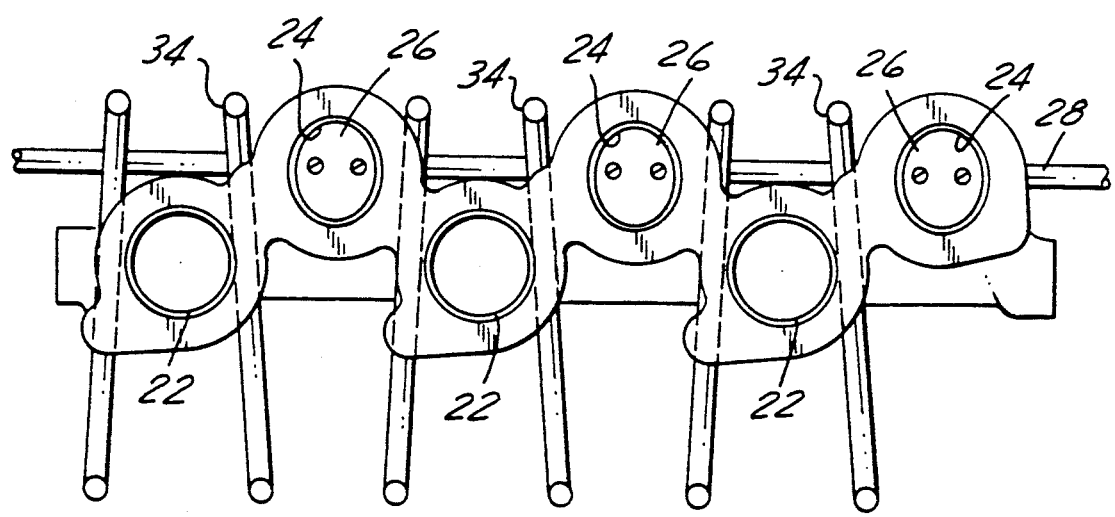
FIG. 3 is a side elevation of a portion of a cylinder head for an engine according to the present invention, taken along the line 3—3 of FIG. 2.

As best seen in FIGS. 1 and 3, secondary passages 24 are splayed vertically upwardly from primary passages 22 such that the two sets of passages lie in separate planes having sufficient separation that common secondary throttle shaft 28 may pass through secondary passages 24, but not through primary passages 22. This prevents problems associated with the need to seal the secondary throttle shaft so as to prevent vacuum leaks. More specifically, because secondary throttle shaft 28 does not pass through primary passages 22, there is no need to provide the additional sealing which would otherwise be required, with its attendant leakage and mechanical drag. Also, flow losses in primary passages 22 are minimized because throttle shaft 28 does not disturb the flow through passages 22.

As shown in the various Figures, an engine according to the present invention may optionally be equipped with pushrod operated valves. In such case, a plurality of rocker arms, 36, is rotatably mounted to cylinder head 10, with each rocker arm 36 having a first end, 36a, in contact with the stem of one of said poppet valves, and a second end, 36b, in contact with a linear drive member, illustrated as a pushrod, 34, extending between the rocker arm and a camshaft driven member. In the illustrated embodiment, pushrods 34, which service intake valves 16, each extend through one of dividing walls 20.

We claim:

1. A multicylinder reciprocating internal combustion engine with a dual induction system, with said engine comprising:

a cylinder head having at least one exhaust poppet valve and a single intake poppet valve for each cylinder, with the intake valve being located so as to control the flow of charge into the cylinder;

a plurality of intake ports for conducting fresh charge to each intake valve, with each of said ports extending through said cylinder head and having a dividing wall for separating the port into primary and secondary passages, with the primary passage being oriented so as to cause rotational flow about the outermost portion of the cylinder, and the secondary passage being oriented so as to cause flow directed about a radially inward portion of the cylinder; and a plurality of secondary throttle valves, with one such valve being located within each of said secondary passages upon a common secondary throttle shaft extending through said secondary passages, but not through said primary passages, for selectively controlling the flow through said secondary passages.

2. An internal combustion engine according to claim 1, with said engine having a combustion chamber defined by the heads of the exhaust valve and the intake valve, as well as by a relatively flat piston top, and further by the cylinder head roof, which is generally wedge shaped.

3. An internal combustion engine according to claim 1, further comprising a plurality of rocker arms rotatably mounted to said cylinder head, with each having a first end in contact with the stem of one of said poppet valves, and a second end in contact with a linear drive member extending between the rocker arm and a camshaft driven member, wherein the linear drive member extends through one of said dividing walls.

4. An internal combustion engine according to claim 3, wherein each of said linear drive members comprises a pushrod.

5. An internal combustion engine according to claim 3, wherein each of said camshaft driven members comprises a tappet.

6. A multicylinder reciprocating internal combustion engine with a dual induction system, with said engine comprising:

a cylinder head having at least one exhaust poppet valve and a single intake poppet valve for each cylinder, with the intake valve being located so as to control the flow of charge into the cylinder;

a plurality of rocker arms, with each having a first end in contact with the stem of one of said poppet valves, and a second end in contact with a linear drive member extending between the rocker arm and a camshaft driven member;

a plurality of intake ports for conducting fresh charge to each intake valve, with each of said ports extending through said cylinder head and having a vertical wall dividing the port into primary and secondary passages, with the primary passage being oriented so as to cause rotational flow about the outermost portion of the cylinder, and the secondary passage being oriented so as to cause flow directed about a radially inward portion of the cylinder, with each of said walls having a passage therethrough for allowing one of said linear drive members to extend through the cylinder head, and with said primary and secondary passages being splayed vertically into separate planes so as to allow clearance for a secondary throttle shaft external to the primary passages; and a plurality of secondary throttle valves, with one such valve being located within each of said secondary passages upon a common secondary throttle shaft extending through said secondary passages, but not through said primary passages, for selectively controlling the flow through said secondary passages.

7. A multicylinder reciprocating internal combustion engine with a dual induction system, with said engine comprising:

a cylinder head having at least one exhaust poppet valve and a single intake poppet valve for each cylinder, with the intake valve being located so as to control the flow of charge into the cylinder;

a combustion chamber defined by the heads of the exhaust valve and the intake valve, as well as by a relatively flat piston top, and further by the cylinder head roof, which is generally wedge shaped;

a plurality of rocker arms, with each having a first end in contact with the stem of one of said poppet valves, and a second end in contact with a pushrod extending between the rocker arm and a tappet;

a plurality of intake ports for conducting fresh charge to each intake valve, with each of said ports extending through said cylinder head and having a vertical wall dividing the port into primary and secondary passages, with the primary passage being oriented so as to cause rotational flow about the outermost portion of the cylinder, and the secondary passage being oriented so as to cause flow directed about a radially inward portion of the cylinder, with each of said walls having a passage therethrough for allowing one of said pushrods to extend through the cylinder head, and with said secondary passages being splayed vertically above said primary passages so as to allow clearance for a secondary throttle shaft external to and above the primary passages; and a plurality of secondary throttle valves, with one such valve being located within each of said secondary passages upon a common secondary throttle shaft extending through said secondary passages and above said primary passages, for selectively controlling the flow through said secondary passages.

* * * * *